United States Patent
Wieczorkiewicz et al.

(10) Patent No.: US 12,229,248 B1
(45) Date of Patent: Feb. 18, 2025

(54) OBSCURING MEMORY ACCESS PATTERNS THROUGH PAGE REMAPPING

(71) Applicant: Amazon Technologies, Inc., Seattle, WA (US)

(72) Inventors: Pawel Wieczorkiewicz, Dresden (DE); Martin Pohlack, Dresden (DE); Uwe Dannowski, Moritzburg (DE); Bjoern Doebel, Dresden (DE)

(73) Assignee: Amazon Technologies, Inc., Seattle, WA (US)

( * ) Notice: Subject to any disclaimer, the term of this patent is extended or adjusted under 35 U.S.C. 154(b) by 415 days.

(21) Appl. No.: 17/203,600

(22) Filed: Mar. 16, 2021

(51) Int. Cl.
*G06F 21/54* (2013.01)
*G06F 9/455* (2018.01)
(Continued)

(52) U.S. Cl.
CPC .......... *G06F 21/54* (2013.01); *G06F 9/45558* (2013.01); *G06F 12/0864* (2013.01);
(Continued)

(58) Field of Classification Search
CPC ...... G06F 21/54; G06F 21/554; G06F 21/566; G06F 21/79; G06F 9/45558;
(Continued)

(56) References Cited

U.S. PATENT DOCUMENTS

| | | | |
|---|---|---|---|
| 6,175,906 B1 * | 1/2001 | Christie | G06F 12/1063 711/144 |
| 6,560,711 B1 * | 5/2003 | Given | G06F 3/0219 726/34 |

(Continued)

FOREIGN PATENT DOCUMENTS

| | | | |
|---|---|---|---|
| CA | 1283220 C | * 4/1991 | ......... G06F 12/0831 |
| CN | 105431862 A | 3/2016 | |

(Continued)

OTHER PUBLICATIONS

M. Neagu, et al., "Protecting Cache Memories Through Data Scrambling Technique," 2014 IEEE 10th International Conference on Intelligent Computer Communication and Processing (ICCP), 2014, pp. 297-303.

(Continued)

*Primary Examiner* — Dereena T Cattungal (74) *Attorney, Agent, or Firm* — S. Scott Foster; Kowert, Hood, Munyon, Rankin & Goetzel, P.C.

(57) ABSTRACT

A computer system and associated methods are disclosed for mitigating side-channel attacks using memory page remapping. The computer system includes a main memory and a shared cache, the shared cache implementing cache set associativity determined by a portion of memory addresses of the main memory. Multiple physical memory pages are reserved for mapping to a virtual memory page, the physical memory pages differing in the respective portions of their memory addresses determining cache set associativity. Accesses to the virtual memory page result in a mapping of one of the reserved physical memory pages to the virtual memory page, with remapping events causing different ones of the physical memory pages to become mapped. This remapping results in varying cache set associativity of elements stored in the virtual memory page over time.

18 Claims, 7 Drawing Sheets

(51) Int. Cl.
  *G06F 12/0864* (2016.01)
  *G06F 12/0882* (2016.01)
  *G06F 21/55* (2013.01)
  *G06F 21/56* (2013.01)
  *G06F 21/79* (2013.01)

(52) U.S. Cl.
  CPC ........ *G06F 12/0882* (2013.01); *G06F 21/554* (2013.01); *G06F 21/566* (2013.01); *G06F 21/79* (2013.01); *G06F 2009/45587* (2013.01); *G06F 2212/7201* (2013.01)

(58) Field of Classification Search
  CPC ............. G06F 12/0864; G06F 12/0882; G06F 2009/45587; G06F 2212/7201
  See application file for complete search history.

(56) References Cited

U.S. PATENT DOCUMENTS

| | | | |
|---|---|---|---|
| 6,961,804 | B2 | 11/2005 | Denneau et al. |
| 8,819,386 | B1* | 8/2014 | Mather ............... G06F 12/0223 711/202 |
| 9,009,385 | B1* | 4/2015 | Juels ..................... G06F 3/0622 711/6 |
| 10,311,229 | B1 | 6/2019 | Pohlack |
| 10,706,147 | B1 | 7/2020 | Pohlack et al. |
| 10,868,665 | B1 | 12/2020 | Pohlack |
| 11,791,978 | B2 | 10/2023 | Qureshi |
| 2003/0177332 | A1* | 9/2003 | Shiota ................ G06F 12/1036 711/170 |
| 2006/0026425 | A1 | 2/2006 | Douceur |
| 2007/0180187 | A1* | 8/2007 | Olson .................... G06F 12/10 711/106 |
| 2008/0109625 | A1* | 5/2008 | Erlingsson .......... G06F 12/1441 711/E12.001 |
| 2011/0202728 | A1* | 8/2011 | Nichols ............... G06F 11/1441 718/1 |
| 2012/0137303 | A1* | 5/2012 | Okada .................. G06F 3/0641 718/104 |
| 2012/0317423 | A1 | 12/2012 | Dolgunov et al. |
| 2013/0290752 | A1* | 10/2013 | Jones .................... G06F 1/3275 713/320 |
| 2014/0059688 | A1* | 2/2014 | Margalit ............... G06F 21/561 726/24 |
| 2014/0359778 | A1* | 12/2014 | Kruglick .............. G06F 21/577 718/1 |
| 2015/0015913 | A1* | 1/2015 | Tanba ................... G06F 12/023 358/1.16 |
| 2015/0326356 | A1 | 11/2015 | Guan |
| 2015/0370724 | A1* | 12/2015 | Lutas .................. G06F 12/1483 711/163 |
| 2016/0253259 | A1* | 9/2016 | Jin ........................ G06F 12/123 711/122 |
| 2017/0004081 | A1* | 1/2017 | Hayakawa .......... G06F 11/1451 |
| 2017/0147509 | A1 | 5/2017 | Nevers |
| 2018/0341767 | A1* | 11/2018 | Basak ..................... G06F 12/06 |
| 2020/0057729 | A1* | 2/2020 | Liu ..................... G06F 12/1009 |
| 2020/0133867 | A1 | 4/2020 | Jia |

FOREIGN PATENT DOCUMENTS

| | | |
|---|---|---|
| CN | 112596802 A | 4/2021 |
| WO | 2009057094 A1 | 5/2009 |
| WO | 2015013133 A1 | 1/2015 |
| WO | WO-2019105565 A1 * | 6/2019 ........... G06F 12/023 |

OTHER PUBLICATIONS

M. Neagu, et al., "Interleaved Scrambling Technique: A Novel Low-Power Security Layer for Cache Memories," 2014 19th IEEE European Test Symposium (ETS), 2014, pp. 1-2.

M. Neagu et al., "Data Scrambling in Memories: A Security Measure," 2014 IEEE International Conference on Automation, Quality and Testing, Robotics, 2014, pp. 1-6.

Mario Werner, et al., "ScatterCache: Thwarting Cache Attacks via Cache Set Radomization", USENXI Association, 28th USENIX Security Symposium, Aug. 14-16, 2019, pp. 675-692.

Hector Marco, et al., "AMD Bulldozer Linux ASLR weakness: Reducing entropy by 87.5%", Retrieved from http://hmarco.org/bugs/AMD-Bulldozer-linux-ASLR-weakness-reducing-mmaped-files-by-eight.html on Oct. 29, 2020, pp. 1-6.

Moinuddin K. Qureshi, "CEASER: Mitigating Conflict-Based Cache Attacks via Encrypted-Address and Remapping", In 2018 51st Annual IEEE/ACM International Symposium on Microarchitecture (MICRO), IEEE, 2018, pp. 775-787.

Zhenghong Wang, et al., "New Cache Designs for Thwarting Software Cache-based Side Channel Attacks", ISCA'07, ACM, Jun. 9-13, 2007, pp. 494-505.

U.S. Appl. No. 17/084,336, filed Oct. 29, 2020, Martin Pohlack et al.

U.S. Appl. No. 17/185,752, filed Feb. 25, 2021, Martin Pohlack et al.

* cited by examiner

OBSCURING MEMORY ACCESS PATTERNS THROUGH PAGE REMAPPING

BACKGROUND

Virtualization of hardware has provided numerous benefits with respect to managing large-scale computing resources for many clients with diverse needs, allowing various computing resources to be efficiently shared by multiple clients. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource. Furthermore, some virtualization technologies are capable of providing virtual resources that span two or more physical resources, such as a single virtual machine with multiple virtual processors that spans multiple distinct physical computing systems. With virtualization, the single physical computing device may create, maintain or delete virtual machines in a dynamic manner. In turn, users may request computer resources from a service provider and be provided with varying numbers of virtual machine resources on an "as needed" basis or at least on an "as requested" basis.

In some virtualization systems, multiple guest virtual machines (VMs) are instantiated on a physical host. These VM instances may be managed using a virtual machine manager (VMM) or hypervisor executing on the host. The VMM presents each virtual machine with isolated hardware resources. By design, each guest VM is unaware of other guest VMs co-located on the same host. Nonetheless, because some hardware resources on the host are necessarily shared among the co-located VMs, information leakage may occur across the VMs. In particular, some hosts employ a shared cache of the central processing unit (CPU). The shared cache thus includes cached data for all guest VMs residing on the host. This shared cache may be exploited in a form of "side-channel" attack, in which an attacker VM is able observe the interactions between a victim VM and the shared cache. The manner in which the victim VM uses the cache may reveal confidential information, such as for example encryption keys employed by the victim VM.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION

Modern computing systems are often optimized for throughput and overall performance, but not necessarily for perfect isolation and constant-time execution of various operations. This opens up timing side channels between multiple parties that share such systems. The systems and methods described herein may be used to mitigate side-channel attacks in virtualized computing systems and/or in local systems in which a cache is shared between multiple instances of guest virtual machines (VMs) or applications residing on a host.

The term "side-channel" may refer to a channel of information flow in a computing system that was not intended for the use of processes or applications executing in the system, e.g., a channel of information flow that is not programmed explicitly by the operating system, but that may be opened in some systems in which shared resources are used, in some embodiments. For example, in a side-channel attack on a virtualization host, an attacker VM operating on the host may manipulate a cache that is shared between it and a victim VM co-located on the host, such that the attacker VM may observe the cache access of victim VM using the same cache. In that case, the shared cache represents a side channel over which information about the victim VM may be leaked.

A cache may be set-associative, that is, organized as S sets with W cache lines per set, in some embodiments. Thus, in an 8-way associative cache, each cache set contains 8 cache lines, which may hold up to 8 memory lines that map to the same cache set. A memory line in the cache may contain multiple addressable words of memory. When the cache is accessed, a cache set index field composed of least valued or least significant bits of the memory page address may be used to locate a cache set. The remaining highest valued or most significant bits may be used as an identifier, otherwise known as a tag or cache tag, for each cache line. After locating the cache set, the tag field of the address is matched against the tag of the W lines in the set to identify if one of the cache lines is a cache hit. As memory is much larger than the cache, more than W memory lines may map to the same cache set, potentially resulting in cache contention. If an access misses in the cache and all lines of the matching set are in use, one cache line must be evicted to free a cache slot for the new cache line. A cache's replacement policy (e.g., least-recently-used or LRU) may determine the line to evict.

One particular type of side-channel attack that exploits the cache is known as a prime and probe attack. In a prime and probe attack, an attacker VM first primes the shared cache by filling up certain cache sets in the cache with its own data. The attacker VM then waits for a victim VM to use the lines in these cache sets. After the wait period, the attacker VM probes the cache sets that were primed by accessing the lines in the cache sets. Based on the latency of these accesses, the attacker VM may infer which of its cached lines in the cache set had been replaced, possibly the victim VM. The attacker VM may re-prime the cache set during the probe phase, to prepare for the next round of accesses by the victim VM. In this manner, over time, the attacker VM may observe the memory access behavior of a victim VM, and extract information from this these observed accesses.

For example, in one particular attack, the attacker may extract a key that is used in an encryption algorithm from the observed cache access pattern. For example, the open source encryption software library GnuPG employs a square-and-multiply exponentiation algorithm as part of basic encryption and decryption operations in RSA-based encryption systems. In an RSA decryption, the decryption key is the exponent e. The square-and-multiply algorithm carries out the calculation by iterating over the binary digits of the exponent e, performing different operations at each step of the iteration, depending on whether a particular digit of exponent is a 0 or a 1. It has been documented that on some systems, the square-and-multiply algorithm produces a memory access pattern that essentially reveals the digits of the exponent e. A number of other techniques are known to extract other types of information from a program's memory usage patterns.

Attacks may also target data, for example, by monitoring of portions of a lookup table used in a software implementation of a symmetric encryption function. This again enables gathering of information about the cryptographic key currently being used.

In order to efficiently carry out such attacks, the attacker VM may have to consistently write to particular areas of the cache. This is because the shared cache is often a high-level cache that is very large in size, and thus it may be impossible to monitor every cache set in the shared cache using prime and probe. The attacker VM may have to identify a particular cache set to monitor and then construct an eviction set that is consistently mapped to that cache set. This eviction set is then used to repeatedly prime and probe the targeted cache set in the shared cache.

Virtual machines may also exploit this lack of isolation to establish covert communication channels that otherwise are not allowed to exist. The possibility to deterministically sense changes of cache state (via timing side-channel) enables two cooperating parties to establish a reliable communication protocol with sufficient bandwidth to either extract information or even establish an interactive control session. Again, the isolation promise is broken and deep content inspection may have to be performed to gain confidence into the isolation property.

Existing mitigation strategies for these attacks, for example constant time operations, using hardware implementations for symmetric cryptography, all require changes in the victim programs because ultimately the system does not offer perfect isolation between parties. Some computing systems may provide processor extensions to allow main memory to be encrypted during execution but, while this may improve isolation, the locations of the data and code remain unchanged. Content is not moved to different positions in memory while being encrypted and this leaves the above attack vectors open. Cache line usage may still be monitored in virtualized environments with multiple guests, for example in cloud computing services.

Various techniques to mitigate attacks that exploit a shared cache using software-only obscuring of cache access patterns are described herein. These systems and methods make placement of cache lines unpredictable through varying the mapping of physical memory pages over time.

Figure 1:
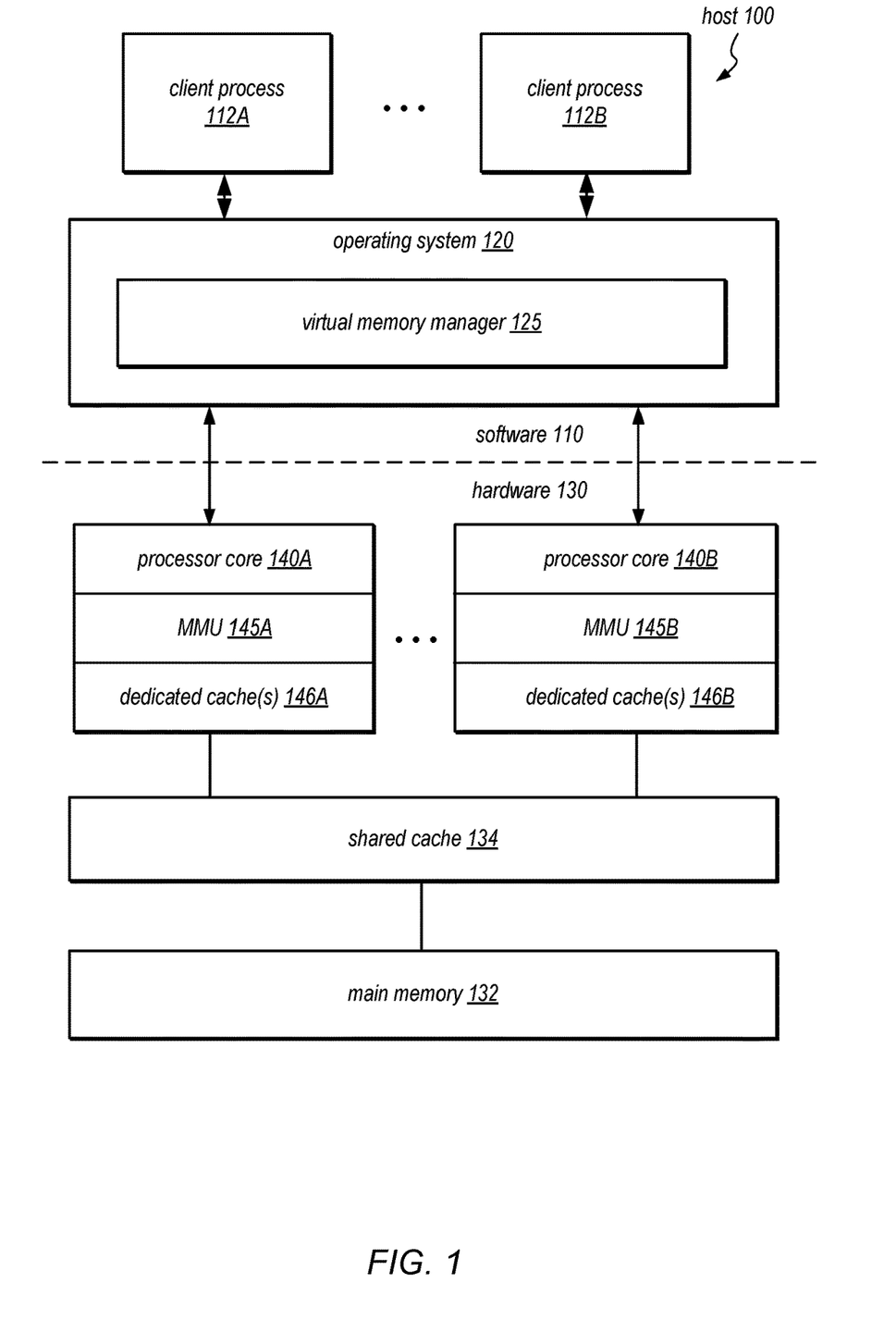
FIG. 1 is a block diagram illustrating an example computer system that implements obscuring of memory access using page remapping, according to some embodiments.

FIG. 1 is a block diagram illustrating an example computer system that implements hardware-assisted obscuring of cache access patterns to mitigate side-channel attacks that exploit a shared cache, according to some embodiments. The system may include a host 100, which includes software 110 that executes on hardware 130.

The hardware 130 may include one or more multi-core processors that each comprise multiple processor cores 140A, 140B, etc. These processor cores may act as separate instruction processing units. The cores may process instructions concurrently, thus increasing the overall speed of the combined processing unit. In some embodiments, processor cores 140A and 140B may reside on a single integrated circuit or chip.

The hardware 130 may also include a main memory 132 addressable by the processor cores which may be the main runtime memory of the host. The main memory 132 may be a form of volatile memory such as dynamic random-access memory (DRAM) or static random-access memory (SRAM). In some embodiments, the main memory 132 may be located in one or more chips or devices different from the processor cores. The host 100 may execute an operating system 120 that manages the main memory 132 for programs of client processes 112 executing on the host 100. When a program needs memory, it may request memory from the operating system, in units called frames or pages.

The hardware 130 may include a shared cache 134 which may act as a cache on the main memory 132 and which is smaller than the main memory 132 but faster to access. In some embodiments, the shared cache 134 is located on the processor chip. As depicted, the shared cache 134 may represent the highest level or tier of the cache hierarchy. As shown, the shared cache 134 is shared by all processor cores 140A, 140B, etc. This sharing may be implemented using a fast communication interface on the processor chip(s). However, accessing the shared cache 134 is still slower than accessing lower levels of the cache hierarchy closer to the processor cores 140 such as the dedicated caches 146 local to the individual processor cores 140. In some embodiments, the shared cache 134 is an inclusive cache, meaning that it contains all cache entries of lower levels of cache in the cache hierarchy.

As depicted, each processor core 140 may also have its own dedicated local caches 146 which may further include L1 data and instruction caches as well as an L2 cache (not shown). The L1 D-cache may be a data cache to speed up data fetch and store, and the L1 I-cache may be an instruction cache to speed up executable instruction fetch. The L2 cache may not be split and into an instruction cache and a data cache. The L2 cache may be larger than the L1 cache but slower to access than the L1 cache. A system may employ more or fewer levels of cache than is shown in FIG. 1 and those of ordinary skill in the art will recognize that the cache organization shown in FIG. 1 is merely an example and is not intended to be limiting.

In operation, data is transferred between the main memory 132 and cache hierarchy in blocks of fixed size, called cache lines or cache blocks. When a cache line is copied from the main memory 132 into the cache, a cache entry is created. The cache entry will include the copied data as well as an indicator of requested main memory location, called a tag. When the processor 140 needs to read or write a location in main memory, the system first checks for a corresponding entry in a first level of cache. If the requested memory location is in the first level, a cache hit has occurred, and the processor simply reads or writes the data in the cache line. However, if the processor does not find the memory location in the first level, the processor 140 proceeds to the next level of the cache hierarchy, and so on, until an entry is found. If the memory location is not found at any level in the cache hierarchy, a cache miss has occurred. In this case, a new cache entry is allocated and data from the main memory 132 is copied into the cache hierarchy, after which the request may be fulfilled from the contents of the cache. Because the slower main memory 132 is accessed during a cache miss, the processor 140 will experience a significant added latency for a memory access that generates a cache miss. The precise details of cache management will be different based on the hardware platform.

The software 110 of the host 100 may comprise an operating system 120 that supports one or more client processes 112A, 112B, etc. The operating system 120 may include one or more modules capable of instantiating and managing the different client processes 112 including a virtual memory manager 125. Client processes 112 each receive a private memory address space, known as a virtual memory space, that the virtual memory manager 125, in combination with hardware memory management units 145, maps to portions of the main memory 132. Further details of virtual memory and the virtual memory manager are provided below in FIGS. 3, 4 and 5.

A client process 112 may execute all of portions of an application on behalf of a client directly or through implementation of one or more virtual machines (VMs). A VM may include one or more compute instances with a specified computational capacity, which may be specified by indicating the type and number of processor cores, the main memory size, and so on, and a specified software stack e.g., a particular version of an operating system which may in turn run on top of a hypervisor (not shown) within the operating system 120. One or more different computing devices may be used singly or in combination to implement the VM instances on the virtualization host. The computing devices may include general purpose or special purpose computers, storage devices, network devices and the like. The instances may operate or implement a variety of different platforms, such as application server instances, JAVA™ virtual machines (JVMs), general purpose or special-purpose operating systems, platforms that support various interpreted or compiled programming languages such as RUBY, PERL, PYTHON, C, C++ and the like, or high-performance computing platforms suitable for performing client applications. Different instances may have different numbers of virtual processor cores, and different amounts of memory, cache, storage and/or networking capacity, as well as any other performance characteristics. Configurations of instances may include their location, in a particular data center, availability zone, geographic, location, etc., and (in the case of reserved compute instances) reservation term length.

VMs executing within the client processes 112 may be instantiated to provide a variety of services that allow clients to use computing resources in a service provider network. These VMs can, for example, provide access to generic compute instances. The service provider network may also provide access to specialized compute instances with specialized functionality, such as routers, domain name systems (DNSs), load balancers, desktop virtualization servers, and the like. The service provider network may include various types of storage services that expose different types of storage access interfaces, including block-based storage services, relational database services, NoSQL database services, file system services, and the like. The service provider network may also include services that provide functionalities of commonly used software modules, which may be used in conjunction with other software to implement larger systems. For example, provided services may include queuing services, notification services, logging services, key storage and management services, and the like. The provided services may include services that implement larger systems with sophisticated functionality, such as machine learning, identity management, software development environments, multi-tenant containers for hosting software tenants, and the like. The services may be standard services provided by the service provider, or services implemented by third parties on top of the standard services. The services may operate on computing resources of the service provider network, and may be controlled and configured by clients via various interfaces such as graphical user interface (GUI) (e.g., as part of an administration control panel or web site) and/or as a programmatic interface such as an Application Programming Interface (API). As the services operate on the service provider's computing resources, usage or performance metrics data may be generated and captured.

Some implementations of the provider network may be a cloud provider network. A cloud provider network (sometimes referred to simply as a "cloud") refers to a pool of network-accessible computing resources (such as compute, storage, and networking resources, applications, and services), which may be virtualized or bare-metal. The cloud may provide convenient, on-demand network access to a shared pool of configurable computing resources that may be programmatically provisioned and released in response to customer commands. These resources may be dynamically provisioned and reconfigured to adjust to variable load. Cloud computing may thus be considered as both the applications delivered as services over a publicly accessible network (e.g., the Internet, a cellular communication network) and the hardware and software in cloud provider data centers that provide those services.

A cloud provider network may be formed as a number of regions, where a region is a separate geographical area in which the cloud provider clusters data centers. Each region may include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers may connect to availability zones of the cloud provider network via a publicly accessible network (e.g., the Internet, a cellular communication network) by way of a transit center (TC). TCs may be considered as the primary backbone locations linking customers to the cloud provider network, and may be collocated at other network provider facilities (e.g., Internet service providers, telecommunications providers) and securely connected (e.g., via a VPN or direct connection) to the availability zones. Each region may operate two or more TCs for redundancy. Regions are connected to a global network connecting each region to at least one other region. The cloud provider network may deliver content from points of presence outside of, but networked with, these regions by way of edge locations and regional edge cache servers (points of presence, or PoPs). This compartmentalization and geographic distribution of computing hardware enables the cloud provider network to provide low-latency resource access to customers on a global scale with a high degree of fault tolerance and stability.

The cloud provider network may implement various computing resources or services, which may include a virtual compute service, data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users of the cloud provider network, which may be provisioned in user accounts.

Computing service(s) may implement various computing resources at one or more data centers. The computing services may include an elastic compute cloud service (referred to in various implementations as an elastic compute service, a virtual machines service, a computing cloud service, a compute engine, or a cloud compute service). This service may offer virtual compute instances (also referred to as virtual machines, or simply "instances") with varying computational and/or memory resources, which are managed by a compute virtualization service (referred to in various implementations as an elastic compute service, a virtual machines service, a computing cloud service, a compute engine, or a cloud compute service). In one embodiment, each of the virtual compute instances may correspond to one of several instance types or families. An instance type may be characterized by its hardware type, computational resources (e.g., number, type, and configuration of central processing units [CPUs] or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics (such as being a "burstable" instance type that has a baseline performance guarantee and the ability to periodically burst above that baseline, or a non-burstable or dedicated instance type that is allotted and guaranteed a fixed quantity of resources). Each instance type may have a specific ratio of processing, local storage, memory, and networking resources, and different instance families may have differing types of these resources as well. Multiple sizes of these resource configurations may be available within a given instance type. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification. The disclosed placement techniques may select a suitable host for the requested instance type based at least partly on the described network performance metrics.

The computing services may also include a container orchestration and management service (referred to in various implementations as a container service, cloud container service, container engine, or container cloud service). A container represents a logical packaging of a software application that abstracts the application from the computing environment in which the application is executed. For example, a containerized version of a software application includes the software code and any dependencies used by the code such that the application may be executed consistently on any infrastructure hosting a suitable container engine (e.g., the Docker® or Kubernetes® container engine). Compared to virtual machines (VMs), which emulate an entire computer system, containers virtualize at the operating system level and thus typically represent a more lightweight package for running an application on a host computing system. Existing software applications may be "containerized" by packaging the software application in an appropriate manner and generating other artifacts (e.g., a container image, container file, or other configurations) used to enable the application to run in a container engine. A container engine may run on a virtual machine instance in some implementations, with the virtual machine instance selected based at least partly on the described network performance metrics.

Figure 2:
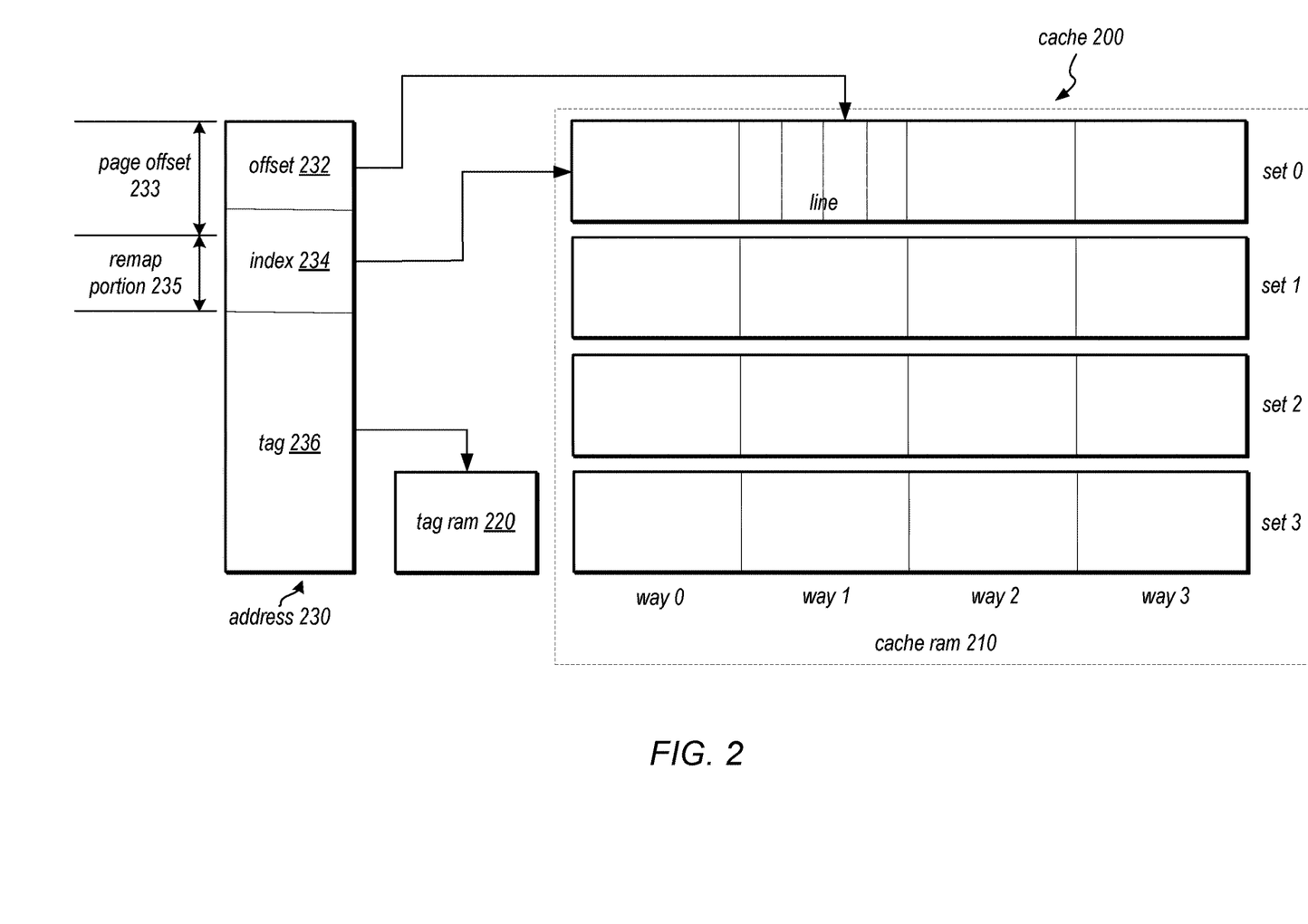
FIG. 2 illustrates the operations of a set associative cache tier for a computer memory system, according to some embodiments.

FIG. 2 illustrates the operations of a set associated cache tier for a computer memory system, according to various embodiments. A cache 200 may include a cache ram 210 and a tag ram 220. Data stored in the cache may be stored in the cache ram 210 while data information identifying specific data stored in the cache, otherwise known as tags or cache tags, may be stored in the tag ram 220, in some embodiments. The tag ram 220 may include a plurality of entries, not shown, where each entry in the cache has a corresponding element in the cache ram 210 and an identifying entry in the tag ram 220.

The cache may be organized as a collection of cache blocks or lines. Each cache line may include one or more processor-addressable words of memory identifiable using a memory address 230. Individual cache lines are organized into sets of cache lines, shown as sets 0-3 in FIG. 2, where a particular memory word may be stored in only one set of cache lines but may be stored in any one of the cache lines within that set. The number of cache lines within a set defines the set-associativity of the cache, shown as ways 0-3 in FIG. 2, where the set-associativity is the number of locations with the cache that an individual memory element may be stored. The total size of the cache, in machine-addressable words, is equal to the number of sets in the cache times the set-associativity.

FIG. 2 shows an example cache organized as a 4-way set-associative cache using cache lines of 4 machine words. Such an example is chosen for clarity of explanation and is not intended to be limiting. Set associative caches may include cache lines of a wide range of sizes in various embodiments from a single machine word to many tens or even hundreds of machine words, although for performance reasons cache line sizes may frequently be powers of two. Likewise, in various embodiments set-associativity may vary from a single line, otherwise known as a direct mapped cache, to a large number of lines. Furthermore, cache subsystems frequently include multiple cache levels, such as cache levels 134, 142, 144 and 146 of FIG. 1, where different levels of the cache subsystem have different configurations of cache line and set associativity sizes to meet differing performance requirements.

To perform a memory access, the cache 200 may receive a memory address 230. In some embodiments, this address may represent a physical address of memory while in other embodiments the address may be a virtual address. The cache may divide the address into three contiguous portions of address bits. The first portion includes a contiguous portion of least significant bits that are used to select a particular memory word within the cache line. In the example configuration of FIG. 2, this first portion, the offset 232, would include the 2 least significant bits, containing the values 0-3, corresponding to the 4 machine words of a cache line.

A second portion of the memory address, the index 234, will contain a number of next least significant bits of the memory address to provide selectivity of individual ones of the cache set. In the example configuration of FIG. 2, this second portion would also include 2 bits, containing the values 0-3, corresponding to the four example cache sets.

The combined portion including the first portion and second portion of the memory address would therefore include the 4 least significant bits. The remaining most significant bits of the memory address would be included in the third portion, the tag 236. The tag 236 may be used to identify the particular memory address in the cache using the tag ram 220.

For an access of the memory address, the cache identifies a particular set, using the index 234, in the cache where the contents of the memory may be found, then searches each of the ways 0-3 of the identified cache set to see if the tag 236 is stored in the respective entries of the tag ram 220. If an entry in the tag ram 220 contains the tag 236, then the contents of the memory address is stored in the cache ram 210 in the line associated with the tag ram entry. The cache may then satisfy the memory access using the particular cache line and the offset 232.

As discussed above, the total size of the cache, in machine-addressable words, is equal to the number of sets in the cache times the set-associativity. A lower portion of address 230 is needed to address the entire size of the cache, the lower portion being the sum of the offset 232 and index 234. Modern computing systems often manage memory, such as the main memory 132 shown in FIG. 1, in fixed sized increments sometimes known as memory frames or memory pages. While the size of these pages may vary, a common page size is 4096 bytes. Such a page size requires a fixed number of the least significant bits of a memory address to access individual elements within the memory page, in the example page size twelve least significant bits would be required. An example page offset 233 reflecting this fixed page size is shown in FIG. 2.

Modern multi-tiered cache designs commonly provide cache tiers sufficiently large to require a greater number of bits to collectively implement the offset 232 and index 234 fields that the page size of the system. As the page offset 233 is of fixed size independent of cache tier, one or more cache tiers may include a portion of memory addresses above the page offset 233 which influence the operation of the cache tier. This is indicated as the remap portion 235.

For example, a shared cache tier may implement 2048 sets of 64 byte cache lines with each cache line requiring 6 bits for the offset 232 and the 2048 sets requiring 11 bits for the index 234. Given a system page size of 4096 bytes requiring 12 bits for the page offset 233, the remap portion 235 of the address 230 would therefore include 5 bit of the memory address 230, leading to 32 address values for a memory page providing unique cache tier behaviors. By changing memory page mappings between the 32 address values, a virtual memory manager, such as the virtual memory manager 125 as shown in FIG. 1, may alter cache behavior without awareness of the client process and without specialized hardware support beyond commonly provided memory management units such as the MMUs 145 as shown in FIG. 1.

Figure 3:
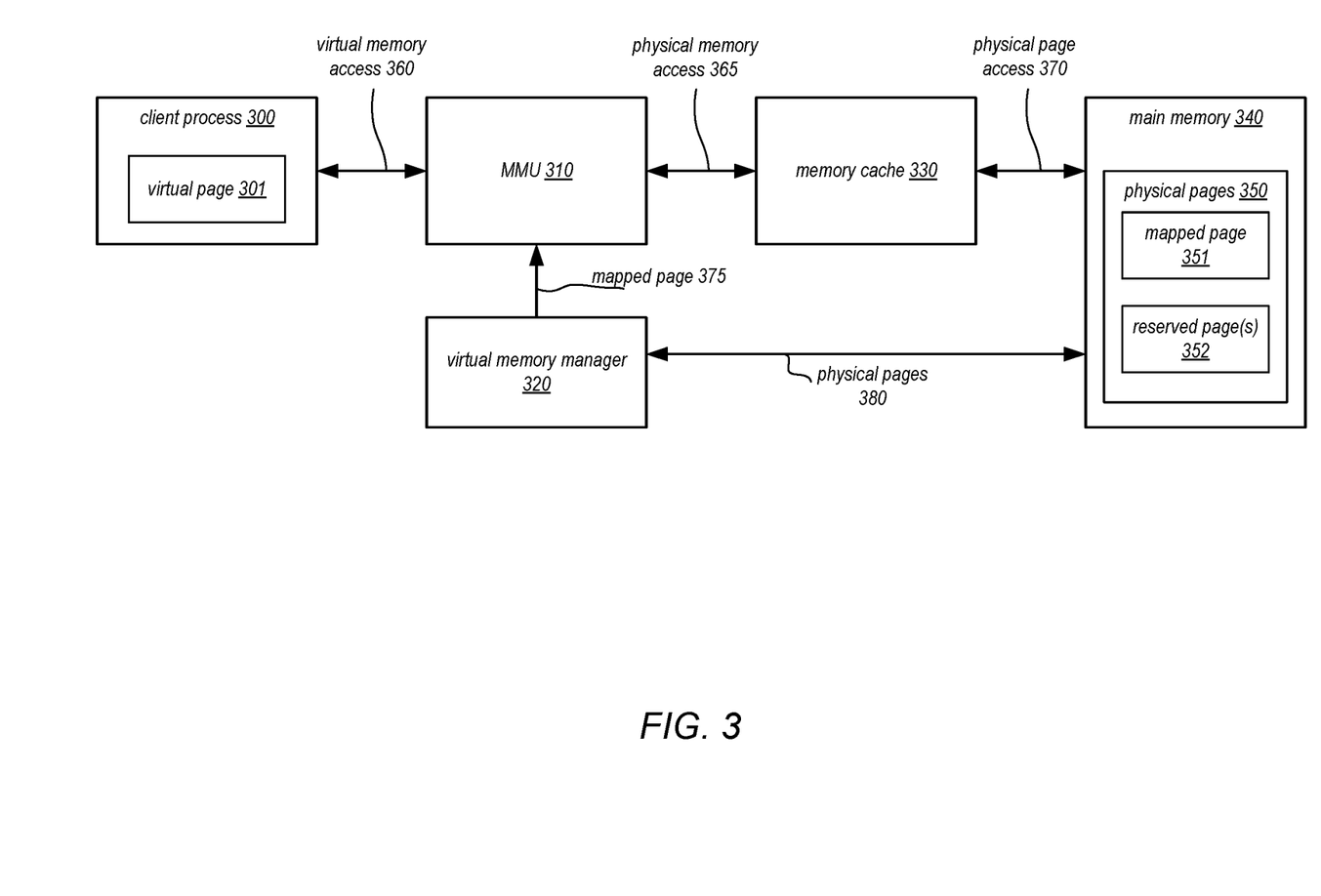
FIG. 3 illustrates the conversion of virtual memory accesses to physical memory accesses in a computer memory system that includes page remapping to mitigate side-channel attacks that exploit a shared cache, according to some embodiments.

FIG. 3 illustrates the conversion of virtual memory accesses to physical memory accesses in a computer memory system that includes page remapping to mitigate side-channel attacks that exploit a shared cache, according to some embodiments. A client process 300, such as the client process 112 as shown in FIG. 1, may include a virtual memory page 301 in which it stores executable code or application data. During execution on a processor, such as the processor core 140 as shown in FIG. 1, a virtual memory access 360 may be performed by the client process 300, in some embodiments.

An MMU 310, such as the MMU 145 as shown in FIG. 1, may be configured in some embodiments to translate the virtual memory access into a physical memory access 365. The MMU 310 may, in some embodiments, perform this translation using a mapped physical memory page 351 provided to the MMU 310 by a virtual memory manager 320, such as the virtual memory manager 125 as shown in FIG. 1.

The physical memory access 365 may then be received at a memory cache 330, such as the dedicated cache 146 or shared cache 134 as shown in FIG. 1 or the cache 200 of FIG. 2. If the memory cache 330 determines that the physical memory access 365 may be satisfied using memory locations within the cache, the memory cache 330 may perform the physical memory access 365 in some embodiments. Otherwise, a physical memory page access 370 may be forwarded to a main memory 340, such as the main memory 132 as shown in FIG. 1.

A main memory 340 may include multiple physical pages reserved by the virtual memory manager 320, as shown in 380, to enable the MMU to translate the virtual page 301 to a physical memory page. These physical pages include a currently mapped page 351 and one or more reserved pages 352. The main memory 340 may then perform the physical page access 370 and result the result to the memory cache 330, in some embodiments. The memory cache 330 may then perform the physical memory access 365 in some embodiments.

Figure 4:
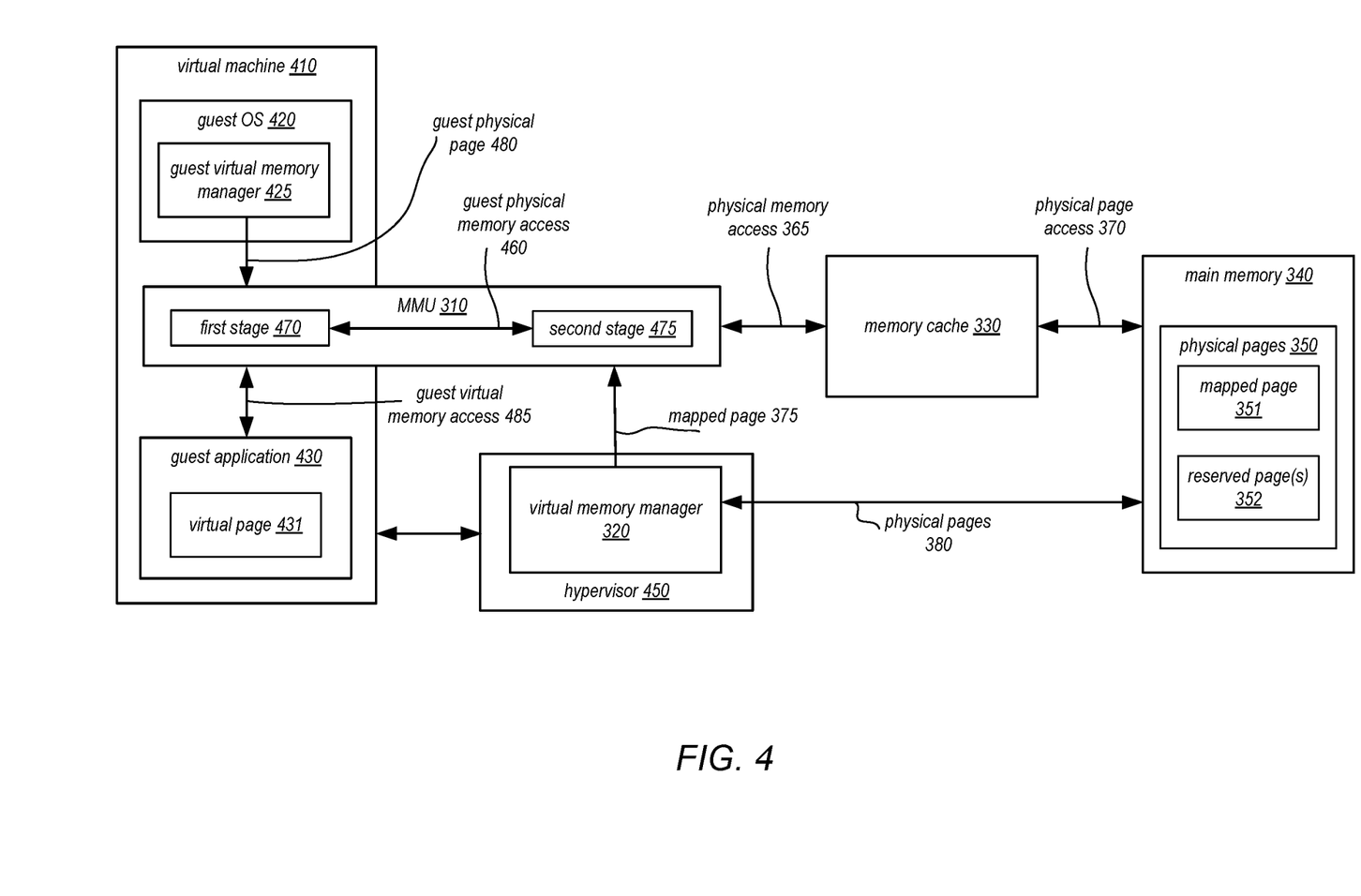
FIG. 4 illustrates the conversion of virtual memory accesses within a virtual machine to physical memory accesses in a computer memory system that includes page remapping to mitigate side-channel attacks that exploit a shared cache, according to some embodiments.

FIG. 4 illustrates the conversion of virtual memory accesses within a virtual machine to physical memory accesses in a computer memory system that includes page remapping to mitigate side-channel attacks that exploit a shared cache, according to some embodiments. A client process, such as the client process 112 as shown in FIG. 1, may incorporate a virtual machine (VM) 410 which includes a guest operating system (OS) or runtime environment 420 which further includes a guest virtual memory manager 425.

The VM 410 may also include a guest application 430 which may include a virtual memory page 431 in which it stores executable code or application data. During execution on a processor, such as the processor core 140 as shown in FIG. 1, a guest virtual memory access 485 may be performed by the guest application 430, in some embodiments.

An MMU 310, such as the MMU 145 as shown in FIG. 1, may be configured in some embodiments to translate the guest virtual memory access into a guest physical memory access 460 at a first stage 470 of the MMU 310. The MMU 310 may, in some embodiments, perform this translation using a guest physical page 480 provided to the MMU 310 by the guest virtual memory manager 425.

The guest physical memory access 460 may then, in some embodiments, be received at a second stage 475 of the MMU 310 where it may be translated into a physical memory access 365 at the second stage 475 of the MMU 310. The MMU 310 may, in some embodiments, perform this translation using a mapped physical memory page 351 provided to the MMU 310 by a virtual memory manager 320, such as the virtual memory manager 125 as shown in FIG. 1. The virtual memory manager 320 may, in some embodiments, be under the control of a hypervisor 450 which may also configure the virtual machine 410.

The physical memory access 365 may then be received at a memory cache 330, such as the dedicated cache 146 or shared cache 134 as shown in FIG. 1 or the cache 200 of FIG. 2. If the memory cache 330 determines that the physical memory access 365 may be satisfied using memory locations within the cache, the memory cache 330 may perform the physical memory access 365 in some embodiments. Otherwise, a physical memory page access 370 may be forwarded to a main memory 340, such as the main memory 132 as shown in FIG. 1.

A main memory 340 may include one or more physical pages 350 reserved by the virtual memory manager 320, as shown in 380, to enable the MMU to translate the virtual page 301 to a physical memory page. These physical pages may include a currently mapped page 351 and optionally one or more reserved pages 352 in various embodiments. The main memory 340 may then perform the physical page access 370 and result the result to the memory cache 330, in some embodiments. The memory cache 330 may then perform the physical memory access 365 in some embodiments.

Figure 5:
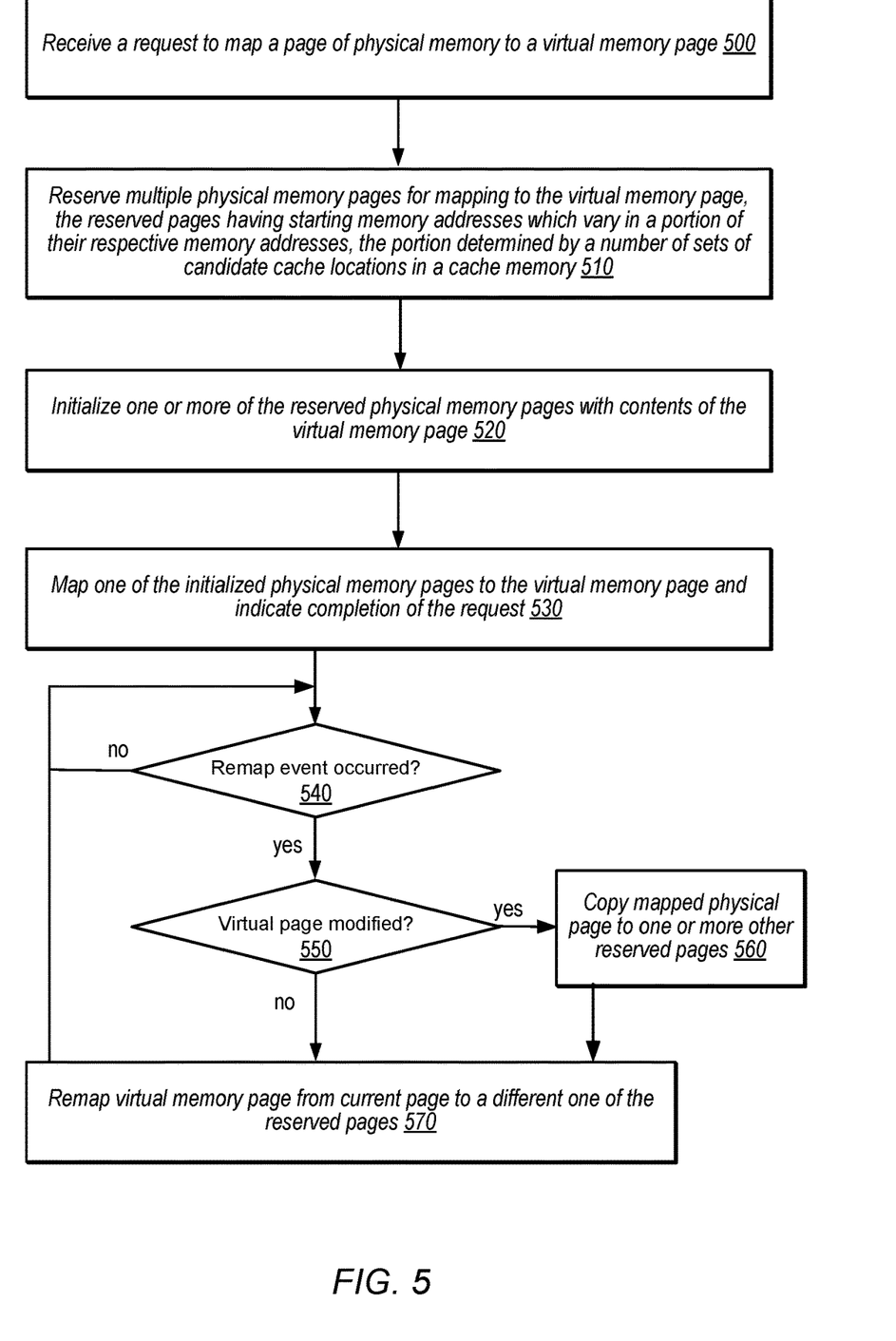
FIG. 5 is a flowchart diagram illustrating a process for obscuring memory access patterns using page remapping and reserved pages to mitigate side-channel attacks that exploit a shared cache, according to some embodiments.

FIG. 5 is a flowchart diagram illustrating a process for obscuring memory access patterns using page remapping to mitigate side-channel attacks that exploit a shared cache, according to some embodiments. The process begins at step 500 where a request to map a page of physical memory to a virtual memory page may be received at a virtual memory manager, such as the virtual memory manager 125 as shown in FIG. 1, in some embodiments. The request may be received in a variety of ways. For example, a processor instruction accessing a virtual memory page that has no corresponding mapped physical memory page may cause a virtual memory page access exception within the processor executing the instruction, and this exception may be configured to be handled by the virtual memory manager. Other means of receiving a request, however, may be envisioned and this example is not meant to be limiting.

Responsive to receipt of the request, the virtual memory manager may reserve multiple physical memory pages for mapping to the virtual memory page, as shown in 510. These reserved physical memory pages may have corresponding starting physical memory addresses, with each address varying from the addresses of other reserved pages in a portion, or range of bits, of the address that determine a cache set index of a set associative cache tier of the system, for example the remap portion 235 of the address 230 as shown in FIG. 2, such that the set of all reserved pages can cover all index sets of the caches.

In various embodiments, all or a portion of all unique values of the remap portion of the physical memory addresses of physical memory pages may be reserved. Furthermore, in some embodiments some physical memory reservations may be deferred while other reservations may occur immediately. After at least some of the physical memory pages have been reserved, the process may proceed to step 520.

Figure 7:
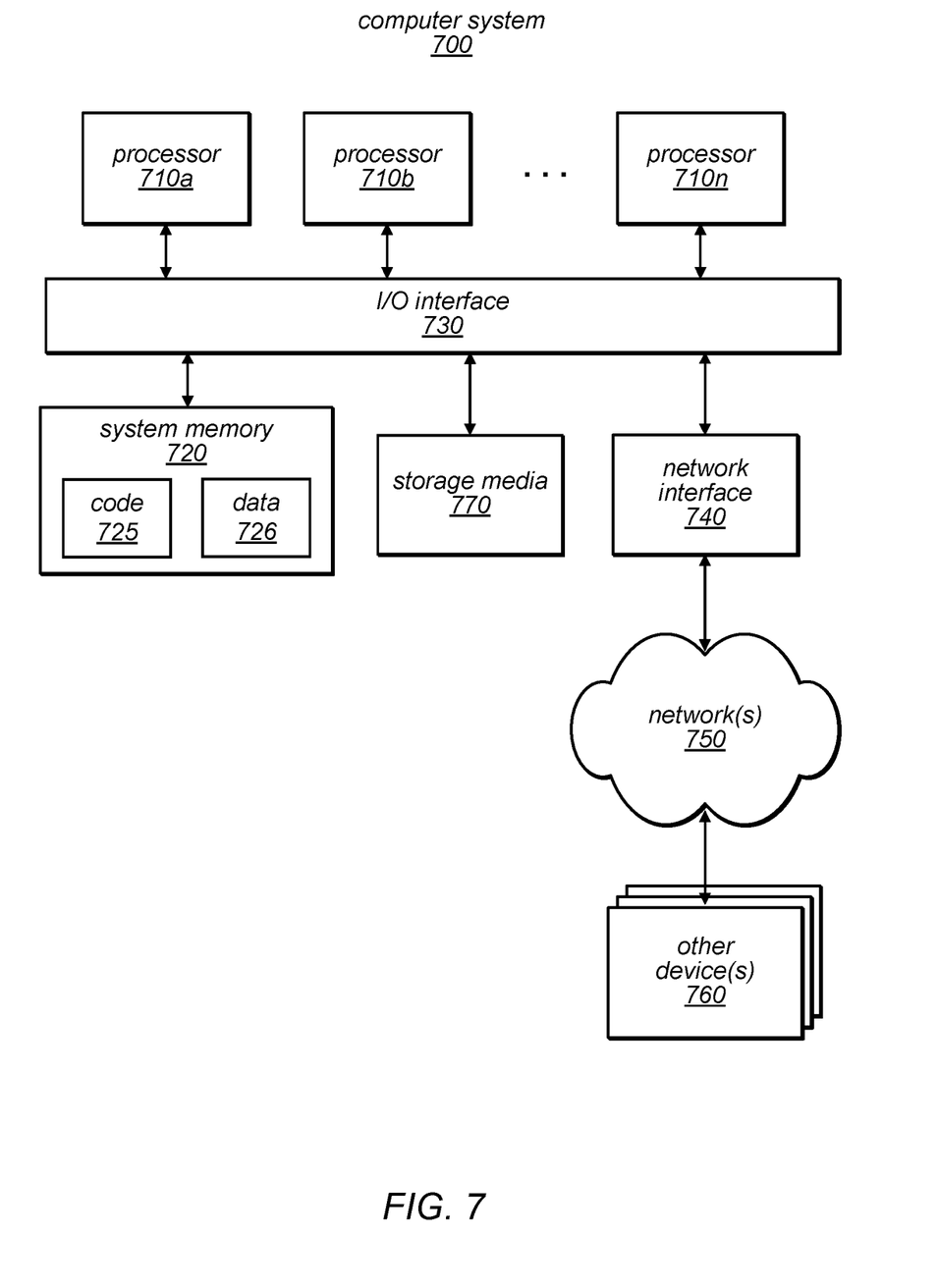
FIG. 7 is a block diagram illustrating an example computer system that mitigates side-channel attacks using a shared cache, according to some embodiments.

As shown in 520, the virtual memory manager may then initialize at least one of the reserved physical memory pages. In the event that the virtual memory page had previously been replaced by the virtual memory manager, the initialization may involve loading the previous contents of the virtual memory page from a memory storage device in the system, such as storage media 670 as shown in FIG. 7.

In some embodiments, the virtual memory manager may further initialize additional reserved physical memory pages. For virtual memory pages that are identified as read-only, such as code pages, the virtual memory manager may exploit the immutable nature of the virtual memory page by preloading the data for the page in multiple reserved physical memory pages in order to more rapidly remap the virtual memory page, as discussed below in 570. In other embodiments, the virtual memory manager may speculatively initialize additional reserved physical memory pages even if the virtual memory page is not identified as immutable. Any number of initialization techniques may be employed in various embodiments and these examples are not meant to be limiting.

Once at least one of the reserved physical pages has been initialized, the virtual memory manager may then map an initialized reserved page to the virtual memory page to complete the request, as shown in 530 according to some embodiments. In some embodiments, the virtual memory manager may configure the mapped physical memory page to be monitored for changes to data within the memory page resulting from write accesses to the virtual memory page.

As shown in 540, the virtual memory manager may then wait to receive a remap event for the virtual memory page, as indicated by the positive exit from 540. This event may take a variety of forms in various embodiments and may occur at a greater or lesser frequency depending on the level of protection from attack desired. For example, the virtual memory manager may be configured to receive a virtual memory page access exception for every virtual access to the memory page not satisfied by the cache. In other embodiments, the virtual memory manager may be configured to receive a periodic or aperiodic notification of the need to remap the page while in still other embodiments a remap event may occur based upon specification by a client of the system. These examples are not intended to be limiting and remap event notifications may take any number of forms and occur for a variety of reasons.

Upon receipt of a remap event, the virtual memory manager may then determine if the virtual page has been modified, in some embodiments. This determination may be made according to a monitoring of the page for write accesses. For example, memory management units, such as the MMUs 145 as shown in FIG. 1, may employ monitor of virtual memory page write accesses and indicate modifications through setting of a "dirty" characteristic for the memory page. This is merely one example of monitoring such memory pages for modifications and any number of monitoring techniques may be employed in various embodiments.

Should the page be modified, as indicated by a positive exit at 550, the process may advance to step 560 where the modified physical page is copied to one or more of the other reserved pages in order for those reserved pages to have current data. In some embodiments, this copying operation may employ a cache flush operation. Once at least one additional reserved page contains current data, the process may advance to step 570, in some embodiments.

If, however, the page is not modified, the process may advance directly to 570 where the virtual memory page may be remapped from the current page to a different one of the reserved pages that store a current copy of the virtual memory page data. This remapping may involve reconfiguration of hardware memory management units, such as the MMUs 145 as shown in FIG. 1, and may further involve flushing of memory management data, such as translation lookaside buffers (TLBs) associated with these MMUs, in various embodiments. Upon completion of the remapping, the previous mapped physical memory page becomes a reserved page for the virtual memory page and the process returns to step 540.

Figure 6:
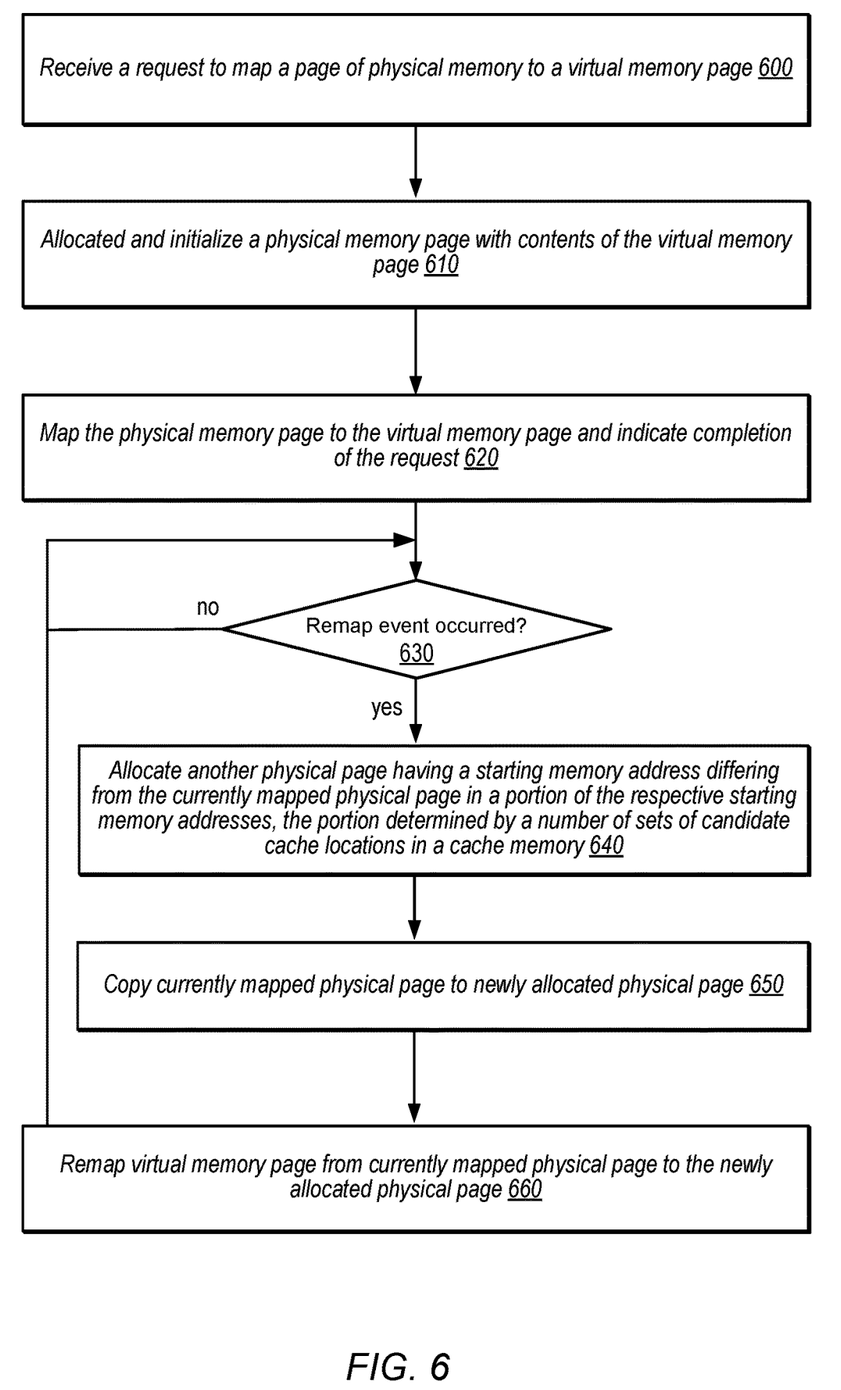
FIG. 6 is a flowchart diagram illustrating a process for obscuring memory access patterns using page remapping without reserved pages to mitigate side-channel attacks that exploit a shared cache, according to some embodiments.

FIG. 6 is a flowchart diagram illustrating a process for obscuring memory access patterns using non-reserved page remapping to mitigate side-channel attacks that exploit a shared cache, according to some embodiments. The process begins at step 600 where a request to map a page of physical memory to a virtual memory page may be received at a virtual memory manager, such as the virtual memory manager 125 as shown in FIG. 1, in some embodiments. The request may be received in a variety of ways. For example, a processor instruction accessing a virtual memory page that has no corresponding mapped physical memory page may cause a virtual memory page access exception within the processor executing the instruction, and this exception may be configured to be handled by the virtual memory manager. Other means of receiving a request, however, may be envisioned and this example is not meant to be limiting.

Responsive to receipt of the request, the virtual memory manager may allocate and initialize a physical memory page for mapping to the virtual memory page, as shown in 610. In the event that the virtual memory page had previously been replaced by the virtual memory manager, the initialization may involve loading the previous contents of the virtual memory page from a memory storage device in the system, such as storage media 670 as shown in FIG. 7. The virtual memory manager may then map the physical page to the virtual memory page to complete the request, as shown in 620 according to some embodiments.

As shown in 630, the virtual memory manager may then wait to receive a remap event for the virtual memory page, as indicated by the positive exit from 630. This event may take a variety of forms in various embodiments and may occur at a greater or lesser frequency depending on the level of protection from attack desired. For example, the virtual memory manager may be configured to receive a virtual memory page access exception for every virtual access to the memory page not satisfied by the cache. In other embodiments, the virtual memory manager may be configured to receive a periodic or aperiodic notification of the need to remap the page while in still other embodiments a remap event may occur based upon specification by a client of the system. These examples are not intended to be limiting and remap event notifications may take any number of forms and occur for a variety of reasons.

As shown in 640, upon receipt of a remap event, the virtual memory manager may then allocate another physical page having a starting memory address differing from the currently mapped physical page in a portion, or range of bits, of the memory address t determine a cache set index of a set associative cache tier of the system, for example the remap portion 235 of the address 230 as shown in FIG. 2, such that the set of all reserved pages can cover all index sets of the caches.

The process may then advance to step 650 where the currently mapped physical page is copied to the newly allocated physical pages. Once the copying completes, the process may advance to step 660, in some embodiments, where the virtual memory page may be remapped from the currently mapped physical page to the newly allocated physical page. This remapping may involve reconfiguration of hardware memory management units, such as the MMUs 145 as shown in FIG. 1, and may further involve flushing of memory management data, such as translation lookaside buffers (TLBs) associated with these MMUs, in various embodiments. Upon completion of the remapping, the previous mapped physical memory page becomes a reserved page for the virtual memory page and the process returns to step 630.

FIG. 7 is a block diagram illustrating an example computer system that mitigates side-channel attacks using a shared cache, according to some embodiments. Computer system 700 may include or be configured to access one or more nonvolatile computer-accessible media. In the illustrated embodiment, computer system 700 includes one or more processors 710 coupled to a system memory 720 via an input/output (I/O) interface 730. Computer system 700 further includes a network interface 740 coupled to I/O interface 730.

In various embodiments, computer system 700 may be a uniprocessor system including one processor 710, or a multiprocessor system including several processors 710 (e.g., two, four, eight, or another suitable number). Processors 710 may be any suitable processors capable of executing instructions. For example, in various embodiments, processors 710 may be general-purpose or embedded processors implementing any of a variety of instruction set architectures (ISAs), such as the x86, PowerPC, SPARC, or MIPS ISAs, or any other suitable ISA. In multiprocessor systems, each of processors 710 may commonly, but not necessarily, implement the same ISA.

System memory 720 may be configured to store instructions and data accessible by processor(s) 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 720 as code 725 and data 726. The system memory 720 may include different levels of cache, some of which may be located on the processor and some away from the processor. One level of the cache hierarchy may be a last level cache that is shared by all of the processors 710*a* to 710*n*. The last level cache may be an inclusive cache of the low levels of cache in the cache hierarchy.

In one embodiment, I/O interface 730 may be configured to coordinate I/O traffic between processor 710, system memory 720, and any peripheral devices in the device, including network interface 740 or other peripheral interfaces. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functionality of I/O interface 730, such as an interface to system memory 720, may be incorporated directly into processor 710.

Network interface 740 may be configured to allow data to be exchanged between computer system 700 and other devices 760 attached to a network or networks 750, such as other computer systems or devices, such as routers and other computing devices. In various embodiments, network interface 740 may support communication via any suitable wired or wireless general data networks, such as types of Ethernet network, for example. Additionally, network interface 740 may support communication via telecommunications/telephony networks such as analog voice networks or digital fiber communications networks, via storage area networks such as Fibre Channel SANs, or via any other suitable type of network and/or protocol.

In some embodiments, system memory 720 may be one embodiment of a computer-accessible medium configured to store program instructions and data as described above for FIGS. 1 through 5 for implementing embodiments of methods and apparatus for traffic analysis. However, in other embodiments, program instructions and/or data may be received, sent or stored upon different types of computer-accessible media. Generally speaking, a computer-accessible medium may include non-transitory storage media 770 or memory media such as magnetic or optical media, e.g., disk or DVD/CD coupled to computer system 700 via I/O interface 730. A non-transitory computer-accessible storage medium may also include any volatile or non-volatile media such as RAM (e.g., SDRAM, DDR SDRAM, RDRAM, SRAM, etc.), ROM, etc., that may be included in some embodiments of computer system 700 as system memory 720 or another type of memory. Further, a computer-accessible medium may include transmission media or signals such as electrical, electromagnetic, or digital signals, conveyed via a communication medium, such as a network and/or a wireless link, such as may be implemented via network interface 740.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

Those skilled in the art will appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-readable medium separate from computer system 700 may be transmitted to computer system 700 via transmission media or signals such as electrical, electromagnetic, or digital signals, conveyed via a communication medium such as a network and/or a wireless link. This computer readable storage medium may be non-transitory. Various embodiments may further include receiving, sending or storing instructions and/or data implemented in accordance with the foregoing description upon a computer-accessible medium. Accordingly, the present invention may be practiced with other computer system configurations.

The various methods as illustrated in the Figures and described herein represent example embodiments of methods. The methods may be implemented in software, hardware, or a combination thereof. The order of method may be changed, and various items may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
    at least one processor; and
    a cached memory subsystem comprising a cache memory and a main memory, the main memory storing program instructions that when executed cause the at least one processor to implement a virtual memory manager configured to:
        responsive to a request to map a physical memory page to a virtual memory page:
            reserve a plurality of physical memory pages of the main memory for the virtual memory page, the plurality of physical memory pages comprising a first physical memory page and second physical memory page, wherein respective ones of the plurality of physical memory pages comprise respective starting memory addresses that differ within a range of memory address bits, the range of memory address bits determined according to a selectivity of locations within the cache memory; and
            map the virtual memory page to the first physical memory page of the reserved plurality of physical memory pages; and
        responsive to a memory remapping event, remap the virtual memory page from the first physical memory page to the second physical memory page, reserved responsive to the request to map the physical memory page to the virtual memory page, to change a mapping of respective locations of the cache memory to locations of the virtual memory page according to differences in the respective ranges of address bits of the first physical memory page and the second physical memory page.

2. The system of claim 1, wherein:
    the cache memory is a set-associative cache memory comprising a plurality of sets of candidate cache locations for storing respective values of memory locations within the virtual memory page, the plurality of sets of candidate cache locations selected at least in part according to the range of address bits; and
    the plurality of physical memory pages comprises a number of physical memory pages up to a maximum number of physical memory pages determined at least in part on a number of the plurality of sets of candidate cache locations.

3. The system of claim 1, wherein:
    the reserving of the second physical memory page comprises initializing data stored in the second physical memory page to match data stored in the first physical memory page;
    the virtual memory page is a writeable memory page; and
    the program instructions that when executed cause the at least one processor to:
        track modifications of the virtual memory page performed subsequent to the mapping of the virtual memory page to the first physical memory page; and
        responsive to determining that no modifications have been made to the virtual memory page subsequent to the mapping of the virtual memory page to the first physical memory page, remap the virtual memory page from the first physical memory page to the second physical memory page without copying data from the first physical memory page to the second physical memory page.

4. The system of claim 1, wherein the virtual memory page is a guest physical memory page of a virtual machine, wherein the virtual machine executes an application on behalf of a client, and wherein the virtual memory page contains data identified by the client as sensitive to a side-channel attack by one or more applications executing on other virtual machines.

5. A method for mapping memory pages, comprising:
    performing, by a virtual memory manager:
        responsive to a request to map a physical memory page to a virtual memory page:
            reserving a plurality of physical memory pages for the virtual memory page, wherein the plurality of physical memory pages are part of a cached memory system comprising a cache memory, wherein the plurality of physical memory pages comprise a first physical memory page and second physical memory page, and wherein respective ones of the plurality of physical memory pages comprise respective starting memory addresses that differ within a range of address bits, the range of memory address bits determined according to a selectivity of locations within the cache memory; and
            mapping the virtual memory page to the first physical memory page of the reserved plurality of physical memory pages; and
        responsive to a memory remapping event, remapping the virtual memory page from the first physical memory page to the second physical memory page reserved responsive to the request to map the physical memory page to the virtual memory page, wherein the remapping of the virtual memory page from the first physical memory page to the second physical memory page changes a mapping of respective locations of the cache memory to locations of the virtual memory page according to differences in the respective ranges of address bits of the first physical memory page and the second physical memory page.

6. The method of claim 5, wherein: the cache memory is a set-associative cache memory comprising a plurality of sets of candidate cache locations for storing respective values of memory locations within the virtual memory page, the plurality of sets of candidate cache locations selected at least in part according to the range of address bits.

7. The method of claim 6, wherein the plurality of physical memory pages comprises a number of physical memory pages up to a maximum number of physical memory pages determined at least in part on a number of the plurality of sets of candidate cache locations.

8. The method of claim 5, wherein the virtual memory page is a read-only memory page, and wherein the reserving of one of the plurality of physical memory pages comprises copying data stored in a physical memory page currently mapped to the virtual memory page to the one of the plurality of physical memory pages.

9. The method of claim 5, wherein:
    reserving the second physical memory page comprises initializing data stored in the second physical memory page to match data stored in the first physical memory page;

the virtual memory page is a writeable memory page; and
remapping the virtual memory page from the first physical memory page to the second physical memory page comprises:
tracking modifications of the virtual memory page performed subsequent to the mapping of the virtual memory page to the first physical memory page; and
responsive to determining that no modifications have been made to the virtual memory page subsequent to the mapping of the virtual memory page to the first physical memory page, remapping the virtual memory page from the first physical memory page to the second physical memory page without copying data from the first physical memory page to the second physical memory page.

10. The method of claim 5, wherein:
reserving the second physical memory page comprises initializing data stored in the second physical memory page to match data stored in the first physical memory page;
the virtual memory page is a writeable memory page; and
remapping the virtual memory page from the first physical memory page to the second physical memory page comprises:
tracking modifications of the virtual memory page performed subsequent to the mapping of the virtual memory page to the first physical memory page; and
responsive to determining that modifications have been made to the virtual memory page subsequent to the mapping of the virtual memory page to the first physical memory page, copying data from the first physical memory page to the second physical memory page prior to remapping the virtual memory page from the first physical memory page to the second physical memory page.

11. The method of claim 5, wherein the virtual memory page is a guest physical memory page of a virtual machine.

12. The method of claim 11, wherein the virtual machine executes an application on behalf of a client, and wherein the virtual memory page contains data identified by the client as sensitive to a side-channel attack by one or more applications executing on other virtual machines.

13. The method of claim 12, wherein the memory remapping event comprises a periodic event determined at least in part by a level of protection from the side-channel attack specified by the client.

14. The method of claim 5, wherein the memory remapping event comprises a virtual memory page access exception.

15. One or more non-transitory computer-accessible storage media storing program instructions that when executed on or across one or more computing devices cause the one or more computing devices to perform:
performing, by a virtual memory manager:
responsive to a request to map a physical memory page to a virtual memory page:
reserving a plurality of physical memory pages for the virtual memory pages wherein the plurality of physical memory pages are part of a cached memory system comprising a cache memory, and wherein respective ones of the plurality of physical memory pages comprise respective starting memory addresses that differ within a range of address bits, the range of memory address bits determined according to a selectivity of locations within the cache memory; and
mapping the virtual memory page to a first physical memory page of the reserved plurality of memory pages; and
responsive to a memory remapping event for the virtual memory page:
copying data stored in the first physical memory page currently mapped to the virtual memory page to a second physical memory page of the reserved plurality of memory pages; and
remapping the virtual memory page from the first physical memory page to the second physical memory page reserved responsive to the request to map the physical memory page to the virtual memory page, wherein the remapping of the virtual memory page from the first physical memory page to the second physical memory page changes a mapping of respective locations of the cache memory to locations of the virtual memory page according to differences in the respective ranges of address bits of the first physical memory page and the second physical memory page.

16. The one or more non-transitory computer-accessible storage media of claim 15, wherein: the cache memory is a set-associative cache memory comprising a plurality of sets of candidate cache locations for storing respective values of memory locations within the virtual memory page, the plurality of sets of candidate cache locations selected at least in part according to the range of address bits.

17. The one or more non-transitory computer-accessible storage media of claim 15, wherein the plurality of physical memory pages comprises a number of physical memory pages up to a maximum number of physical memory pages determined at least in part on a number of the plurality of sets of candidate cache locations.

18. The one or more non-transitory computer-accessible storage media of claim 15, wherein the virtual memory page is a guest physical memory page of a virtual machine, wherein the virtual machine executes an application on behalf of a client, and wherein the virtual memory page contains data identified by the client as sensitive to a side-channel attack by one or more applications executing on other virtual machines.

* * * * *